(12) United States Patent
Chockler et al.

(10) Patent No.: US 8,856,755 B2
(45) Date of Patent: Oct. 7, 2014

(54) DOMINANT-STATE-BASED COVERAGE METRIC

(71) Applicant: International Business Machines Corporation, Armonk, NY (US)

(72) Inventors: Hana Chockler, Haifa (IL); Dmitry Pidan, Netanya (IL); Sitvanit Ruah, Rehovot (IL); Karen Yorav, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 62 days.

(21) Appl. No.: 13/751,088

(22) Filed: Jan. 27, 2013

(65) Prior Publication Data

US 2014/0215445 A1    Jul. 31, 2014

(51) Int. Cl.
*G06F 9/44* (2006.01)
*G06F 11/36* (2006.01)

(52) U.S. Cl.
CPC .................................. *G06F 11/3676* (2013.01)
USPC ........................................... 717/132; 717/131

(58) Field of Classification Search
None
See application file for complete search history.

(56) References Cited

U.S. PATENT DOCUMENTS

| | | | |
|---|---|---|---|
| 6,484,134 B1 * | 11/2002 | Hoskote | 703/14 |
| 6,957,404 B2 * | 10/2005 | Geist et al. | 716/103 |
| 7,120,568 B1 * | 10/2006 | Geist et al. | 703/13 |
| 7,146,605 B2 * | 12/2006 | Beer et al. | 717/126 |
| 7,155,374 B2 * | 12/2006 | Ben-David | 703/2 |
| 7,519,957 B2 * | 4/2009 | Keidar-Barner et al. | 717/127 |
| 7,788,646 B2 * | 8/2010 | Ward | 717/132 |
| 8,495,593 B2 * | 7/2013 | Adams et al. | 717/136 |
| 8,527,954 B2 * | 9/2013 | Benameur et al. | 717/126 |
| 8,527,976 B2 * | 9/2013 | Kahlon et al. | 717/152 |
| 8,553,587 B2 * | 10/2013 | Aggarwal | 370/256 |
| 8,660,905 B2 * | 2/2014 | Weber et al. | 705/26.1 |

OTHER PUBLICATIONS

Jhala et al., Title "Software Model Checking", ACM Computing Surveys, vol. 41, No. 4, Article 21, Publication date: Oct. 2009.*
Barner et al., "ExpliSAT: Guiding SAT-Based Software Verification with Explicit States", Haifa Verification Conference, pp. 138-154, 2006.

* cited by examiner

*Primary Examiner* — Don Wong
*Assistant Examiner* — Hossain Morshed
(74) *Attorney, Agent, or Firm* — Ziv Glazberg (57) ABSTRACT

A method, apparatus and product for dominant state based coverage metric. The method comprising: determining whether all possible states of a computer program were examined based on an analysis of states that were examined excluding controlled states that are dominated by a self-dominating states; wherein the controlled states are associated with a controlled nodes in a control flow graph of the computer program, wherein the self-dominating states are associated with a self-dominating node in the control flow graph; wherein each execution path in the control flow graph that reaches the controlled nodes also includes the self-dominating node; and wherein there exists an execution path in the control flow graph that both starts and ends at the self-dominating node and further includes at least one controlled node.

21 Claims, 3 Drawing Sheets

DOMINANT-STATE-BASED COVERAGE METRIC

TECHNICAL FIELD

The present disclosure relates to verification in general, and to verification of software having dominant-states, in particular.

BACKGROUND

Quality assurance of computer programs may be desired. However, validating computer programs may be a hard task because the computer program represents a system may have a significant number of potential states and potentially infinite number of states, making the verification problem undecidable.

Coverage analysis provides metrics that attempt to indicate thoroughness of validation. In testing, there exist numerous coverage metrics that serve as heuristic measures of exhaustiveness of a test suite. In formal verification of software, no such metrics exist. The straightforward metrics that check line and branch coverage are not very useful in formal verification, since taking a branch or looking at a line does not necessarily means that it was exhaustively analyzed.

Computer programs may comprise a loop which may be performed iteratively. Such loops may potentially be unbounded and may be performed forever. Such as scenario is exhibited, for example, in a reactive system, in which an unbounded loop is performed until an event is detected and corresponding actions, which may or may not be deterministic, are performed. After performing those actions, the system may perform the loop once more to detect an event and potentially react to the event.

Formal verification is a technique in which the computerized component is modeled and is examined by a model checker. A verification query comprises a model and a property, wherein the model is to be checked whether it holds the property or there exists a behavior of the model that refutes the property. The model describes all possible functional behaviors of the computerized component based on inputs from the environment and calculations performed by the computerized component itself. Most components are represented by cycled models in which the state of the component may differ from one cycle to the other. It will be noted that the computerized component may be a software component, firmware component, hardware component or the like.

In software formal verification, the model may be deemed as changing a cycle upon modification to the program counter or program instructor. Alternatively, other temporal schemas may be used.

A model checker checks that the model holds a predetermined specification property. An exemplary specification property may be that a triggered event is always handled by the component or that a certain variable is never assigned a predetermined value. The specification property may be attributed to one or more cycles, such as for example, after a flag is raised in a cycle, an alert is eventually issued. In some exemplary embodiments, the property may be any property such as safety property or liveness property, and may be provided using a Property Specification Language (PSL) formula such as AGp, indicating that Always (i.e., in each cycle), Globally (i.e. in each possible scenario), property p holds. Property p may be a property provided in temporal logic.

Model checkers may be symbolic model checkers, explicit model checkers, or the like. The model checker may utilize a Boolean Satisfiability problem (SAT) solver, and known as SAT-based model checkers, such as for example a Bounded Model Checker (BMC), Interpolant-based Transition Relation approximation, or the like. Additionally or alternatively, model checkers may be Binary Decision Diagrams (BDD)-based model checker.

ExpliSAT™ is a hybrid formal verification for software model checking that combines explicit-state and symbolic techniques, wherein the control flow graph of the program is explicitly traversed. ExpliSAT is disclosed in S. Barner, C. Eisner, Z. Glazberg, D. Kroening, I. Rabinovitz, "ExpliSAT: Guiding SAT-Based Software Verification with Explicit States", HVC 2006, which is hereby incorporated by reference in its entirety.

BRIEF SUMMARY

One exemplary embodiment of the disclosed subject matter is a computer-implemented method performed by a processing unit, the method comprising: determining whether all possible states of a computer program were examined based on an analysis of states that were examined excluding controlled states that are dominated by a self-dominating states; wherein the controlled states are associated with a controlled nodes in a control flow graph of the computer program, wherein the self-dominating states are associated with a self-dominating node in the control flow graph; wherein each execution path in the control flow graph that reaches the controlled nodes also includes the self-dominating node; and wherein there exists an execution path in the control flow graph that both starts and ends at the self-dominating node and further includes at least one controlled node.

In some exemplary embodiments, the self-dominating node is a head node of a loop in the control flow graph and wherein the controlled nodes are nodes within the loop. In some exemplary embodiments, the loop is an unbounded loop. In some exemplary embodiments, the method further comprising outputting a coverage metric value based on a number of self-dominating states examined. In some exemplary embodiments, the metric is based on a growth factor in the number of self-dominating states examined. In some exemplary embodiments, the method further comprising verifying the computer program by traversing the control flow graph, wherein said verifying utilizes a state history mechanism that is based on an implicit indication of previous examination of states associated with the nodes within the loop. In some exemplary embodiments, said verifying is formal verifying the computer program by explicitly traversing the control flow graph. In some exemplary embodiments, said verifying utilizes a symbolic representation of the states of the computer program. In some exemplary embodiments, wherein the state history mechanism retains examined states or signature thereof, wherein the retained examined states do not comprise the states associated with the nodes within the loop. In some exemplary embodiments, the method further comprises: in response to examining a first state associated with the head node, examining all successive states associated with the nodes within the loop; and in response to having a second state associated with the head node to be examined, determining whether to examine the second state based on a history of examined self-dominated states, thereby enabling the state history mechanism to avoid keeping track of any examined state that is associated with the nodes within the loop.

Another exemplary embodiment of the disclosed subject matter is a computerized apparatus having a processor coupled to a memory unit, the processor being adapted to perform the steps of: determining whether all possible states of a computer program were examined based on an analysis of states that were examined excluding controlled states that are dominated by a self-dominating states; wherein the controlled states are associated with a controlled nodes in a control flow graph of the computer program, wherein the self-dominating states are associated with a self-dominating node in the control flow graph; wherein each execution path in the control flow graph that reaches the controlled nodes also includes the self-dominating node; and wherein there exists an execution path in the control flow graph that both starts and ends at the self-dominating node and further includes at least one controlled node.

In some exemplary embodiments, the self-dominating node is a head node of a loop in the control flow graph and wherein the controlled nodes are nodes within the loop. In some exemplary embodiments, the loop is an unbounded loop. In some exemplary embodiments, the processor is further adapted to output a coverage metric value based on a number of self-dominating states examined. In some exemplary embodiments, the metric is based on a growth factor in the number of self-dominating states examined. In some exemplary embodiments, the processor is further adapted to verify the computer program by traversing the control flow graph, wherein said verifying utilizes a state history mechanism that is based on an implicit indication of previous examination of states associated with the nodes within the loop. In some exemplary embodiments, said verifying is formal verifying the computer program by explicitly traversing the control flow graph. In some exemplary embodiments, said verifying utilizes a symbolic representation of the states of the computer program. In some exemplary embodiments, the state history mechanism retains examined states or signature thereof, wherein the retained examined states do not comprise the states associated with the nodes within the loop. In some exemplary embodiments, the processor is further adapted to perform the steps of: in response to examining a first state associated with the head node, examining all successive states associated with the nodes within the loop; and in response to having a second state associated with the head node to be examined, determining whether to examine the second state based on a history of examined self-dominated states, thereby enabling the state history mechanism to avoid keeping track of any examined state that is associated with the nodes within the loop.

Yet another exemplary embodiment of the disclosed subject matter is a computer program product comprising a non-transitory computer readable medium retaining program instructions, which instructions when read by a processor, case the processor to performs the steps of: determining whether all possible states of a computer program were examined based on an analysis of states that were examined excluding controlled states that are dominated by a self-dominating states; wherein the controlled states are associated with a controlled nodes in a control flow graph of the computer program, wherein the self-dominating states are associated with a self-dominating node in the control flow graph; wherein each execution path in the control flow graph that reaches the controlled nodes also includes the self-dominating node; and wherein there exists an execution path in the control flow graph that both starts and ends at the self-dominating node and further includes at least one controlled node.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

The disclosed subject matter is described below with reference to flowchart illustrations and/or block diagrams of methods, apparatus (systems) and computer program products according to embodiments of the subject matter. It will be understood that blocks of the flowchart illustrations and/or block diagrams, and combinations of blocks in the flowchart illustrations and/or block diagrams, can be implemented by computer program instructions. These computer program instructions may be provided to one or more processors of a general purpose computer, special purpose computer, a tested processor, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transient computer-readable medium that can direct a computer or other programmable data processing apparatus to function in a particular manner, such that the instructions stored in the non-transient computer-readable medium produce an article of manufacture including instruction means which implement the function/act specified in the flowchart and/or block diagram block or blocks.

The computer program instructions may also be loaded onto a device. A computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

In the present disclosure, "formal verification" is technique attempting to verify a correctness of a computer program using a modeling thereof and without executing the program. Formal verification may verify or falsify a target property, also referred to as specification property. The specification property may be a temporal property relating to states of the model at different times, such as but not limited to a safety property (e.g., AGp), a liveness property (e.g., A→eventually! P), or the like. In some exemplary embodiments, the specification property may be that no assertion statement fails, and for each assertion statement that is to be executed, all possible values thereof may be examined. Formal verification may also include symbolic execution in which a symbolic representation is used to validate in combination a set of alternative executions. Formal verification may utilize a model checker which may be explicit, symbolic or combination thereof.

In the present disclosure, a computer program is said to have "states". The program can be seen as a model, such as a Finite State Machine (FSM). A state may indicate the internal configuration of the program, such as but not limited to valuation of each variable, valuation of heap and stack memory sections, values in hardware registers, program counters of each process or thread of the program, input provided to the program from its environment, such as from a user, from a clock, or from another device, or the like.

In the present disclosure, a "Control Flow Graph" is a representation, using graph notation, of all paths that might be traversed through a program during its execution. Control Flow Graph (CFG) comprises of nodes, each associated with a different instruction of the computer program.

In the present disclosure, a node d of a CFG is said to be a dominant node over a controlled node c, also denoted as d dom c, if every possible execution path in the CFG to c includes d. A node d is said to be self-dominating if there exists an execution path in the CFG that in order to reach d a second time, the execution passes through d a first time. As an example, a head node of a loop in the CFG is a self-dominating node which dominates over the nodes of the loop itself.

In the present disclosure, a "controlled state" with respect to a self-dominating state is a state which is associated with a controlled node dominated by a self-dominating node associated with the self-dominating state, that is reachable from the self-dominating state without passing through the self-dominating node a second time. As an example, all states of the loop that are reachable in the same iteration of the loop are controlled states with respect to a state associated with the head node of the loop at the beginning of the same iteration.

One technical problem dealt with the disclosed subject matter is providing a metric that indicate thoroughness of validation or verification. In formal verification of software, no such metric exists. The metrics, such as used in testing, that check line and branch coverage are not very useful in formal verification, since taking a branch or looking at a line does not necessarily means that it was exhaustively analyzed.

Another technical problem dealt with the disclosed subject matter is handling a large number of states of a model, which may be exponentially large. In order to exhaustively analyze the state-space during formal verification it may be required to store a history of states that were examined so as to indicate whether a next state of a currently examined state should be examined or was previously validated.

Yet another technical problem is to verify computer programs having loops that are potentially infinite loops, such as in a reactive system.

One technical solution is to use a notion of self-dominating states to implicitly represent all controlled states thereof. In some exemplary embodiments, the self-dominating state implicitly indicates all controlled states thereof, and may be used for coverage metric or a history mechanism of a formal verification process.

In some exemplary embodiments, an algorithm for checking functional coverage of reactive software systems by verification procedures. For systems with a finite number of states, one coverage metric is computes the number or percentage of state processed by the verification procedure. When an indication of whether additional states are going to be encountered later is not available, it is a heuristic measure of progress. For example, the set of covered symbolic states may be kept and measured for growing rate as heuristic. Additionally or alternatively, the percentage of the states encountered from the total potential test-space may be computed and used as heuristic measurement.

In a particular case of systems—systems with an infinite outer loop, inside which there is the whole functionality of the system—a special treatment to the states that correspond to the head loop node (e.g., beginning of the loop program locations). Different behaviors in each iteration of the outer loop may be induced by the state of the program at the beginning of the loop and non-deterministic choices in the loop: inputs, coin tosses, values of variables, interrupts, etc. In some exemplary embodiments of the disclosed subject matter a self-dominating state that is traversed (e.g., a state that correspond to the loop head node) may be stored and all controlled states dominated by the self-dominating states may be verified (e.g., all control paths inside the single iteration of the loop) exhaustively (for example, by doing Breadth First Search (BFS) of the next states after the self-dominating state). The traversed self-dominating state may be saved in a history mechanism, such as an efficiently searchable data structure, therefore implicitly indicating that the controlled states were also traversed.

The disclosed subject matter may be applied to any model-checking tool that traverses the control flow graph of the program explicitly.

In some exemplary embodiments, controlled states are excluded from being stored in a history mechanism. For each self-dominating state, all possible behaviors inside a single iteration of the loop are verified, thus verifying all possible loop heads ensures that the whole functionality of the loop is verified.

One technical effect of utilizing the disclosed subject matter is to provide for a compact history mechanism implicitly indicating traversing/examining controlled states by explicitly including the self-dominating state that dominates it.

Another technical effect is providing a measure of progress relating to verification and testing of computer programs which is based on the self-dominating states that were examined.

Figure 1:
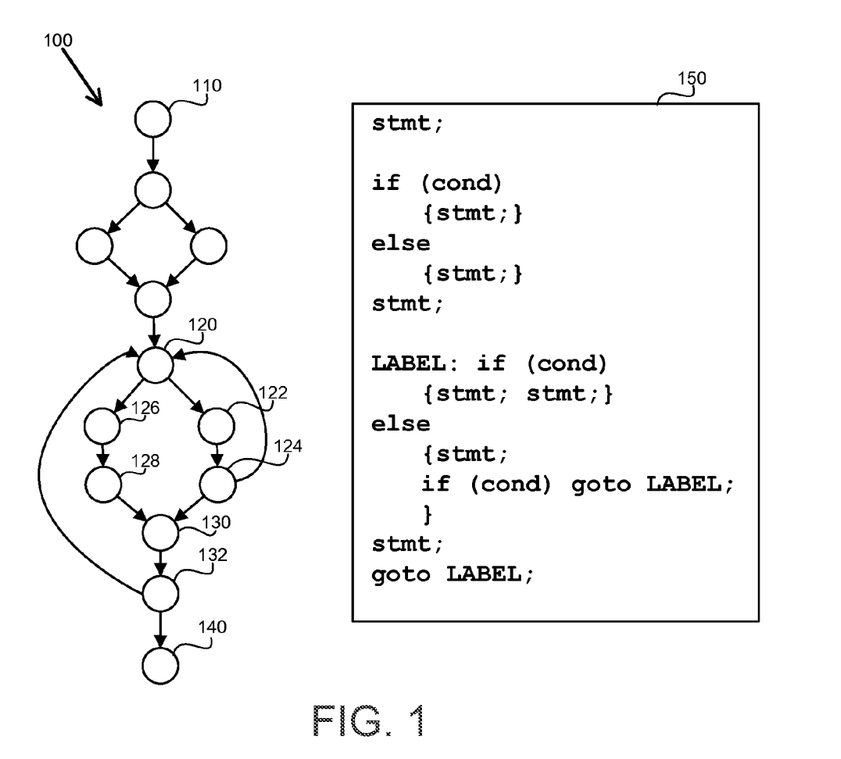
FIG. 1 shows a flowchart diagram of steps in a method, in accordance with some exemplary embodiments of the disclosed subject matter.

Referring now to FIG. 1 showing an schematic illustration of a CFG, in accordance with some exemplary embodiments of the disclosed subject matter. A CFG 100 may correspond to a Computer Program (CP) 150. Statements in CP 150 may be nondeterministic, may be based on input from the environment or a user, or the like.

An Initial Node 110 may represent the first statement of CFG 100, a first statement in CP 150, in a portion thereof, or the like.

Each node of CFG 100 may correspond to a different statement that may be executed by CP 150. Each node may correspond to a different potential program location (e.g., program counter value or instruction pointer value).

Node 120 is a dominating node over Nodes 122, 124, 126, 128, 130, 132. Node 120 is a self-dominating node.

Node 120 is a loop head node with respect to the loop consisting of Nodes 120-132. It will be noted that CP 150 does not necessarily comprise a loop program construct and may use one or more conditional or unconditional goto instructions in order to create a loop in CFG 100.

In some exemplary embodiments, once a state associated with Node 120 is encountered, the controlled states associated with nodes of the loop (Nodes 122-132) may be exhaustively traversed, thereby enabling the state to be used as an implicit indication that the controlled states were examined. A second iteration of the loop may be examined only if the new state associated with Node 120 was not previously encountered.

In some exemplary embodiments, Node 140 may not be considered as controlled by self-dominating node 120 in view of Node 140 being outside of the loop.

Figure 2:
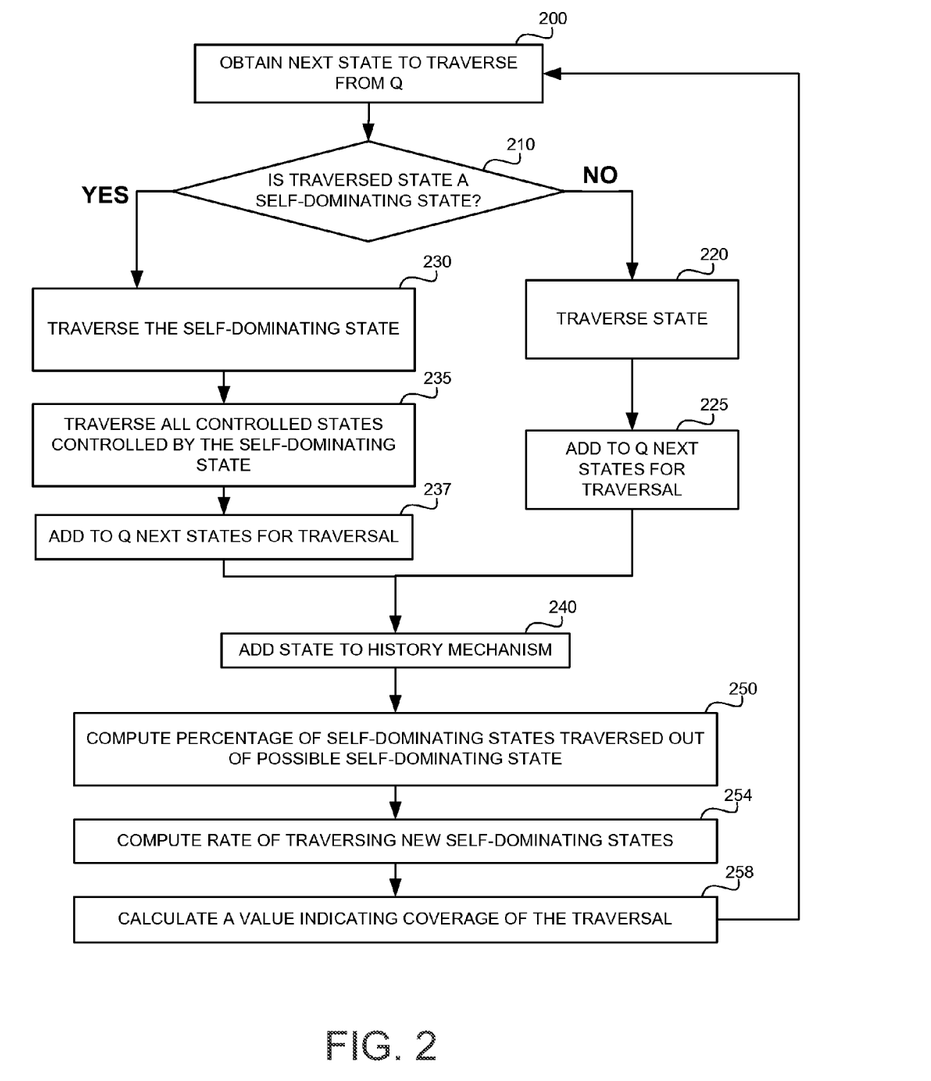
FIG. 2 shows a flowchart diagram of steps in a method, in accordance with some exemplary embodiments of the disclosed subject matter.

Referring now to FIG. 2 showing a flowchart diagram of steps in a method, in accordance with some exemplary embodiments of the disclosed subject matter.

In Step 200, a next state to be traversed is obtained. The next state may be obtained from a queue (Q) of states to traverse. The next state may be an explicit state or a symbolic state symbolically representing a group of states. The queue may be retained by a model checker, a symbolic execution tool, a formal verification tool, or the like.

In Step 210, the state to be traversed is checked. If the state is a self dominating state, Step 230 may be performed. Otherwise, Step 220 may be performed. In some exemplary embodiments, the state is examined to check for the associated node in the CFG, such as by examining the value of the program counter or instruction pointer.

In Step 220, the state may be traversed. The state may be traversed by executing or simulating execution of the node associated with the state. The state may be traversed by checking whether the specification property holds in the state, or the like.

In Step 225, one or more potential next states after the state may be determined, such as based on the simulated execution, based on a Transition Relation (TR), or the like. The next state may be added to a next state queue (Q) to be traversed later on.

In case the state is a self-dominating state, such as a state associated with a node at the head of a loop, Step 230 may be performed. State 230 may be traversed, similarly to traversal in Step 220.

In Step 235 all controlled stated controlled by the self-dominating state, such as all states of the same loop iteration, may be traversed. In Step 235 all controlled states are exhaustively traversed. In some exemplary embodiments, a second queue may be used for the state traversal. In some exemplary embodiments, queue Q may be used in such a manner that assures that all controlled states be removed from queue before any other state is removed from the queue. In some exemplary embodiments, the states may be introduced to the queue in a BFS order, giving precedent to controlled states.

In Step 237, all next states encountered in the traversal of Steps 230 and/or 235 that are not controlled states may be added to Q to be traversed later on.

In Step 240, the state is added to a history mechanism that retains states or fingerprint thereof, that were traversed. The history mechanism may be used before adding a state to queue Q (e.g., in Steps 225, 237) to ensure that each state will be traversed no more than once. In some exemplary embodiments, the history mechanism may be used when obtaining a next state to traverse (Step 200), where the state removed from the queue may be checked against the history mechanism to avoid duplicative traversal of a state.

In Step 250, a percentage of self-dominating states traversed out of the possible self-dominating states may be computed. In some exemplary embodiments, an estimation of the number of self-dominating states associated with a particular self-dominating node (e.g., Node 120 of FIG. 1) may be determined. In one exemplary embodiment, the estimation may be based on a model of the computer program, such as for example a binary encoding to represent each state. Additionally or alternatively, a functional model may be used to estimate the potential number of states associated with the node. In some exemplary embodiments, several percentiles may be computed, each with respect to a different self-dominating node in the CFG.

In Step 254, a rate of traversing new self-dominating states may be computed. In each iteration of the loop, new self-dominating states associated with the head node of the loop may be discovered and added to the queue. Over time, the rate of discovering new self-dominating states may reduce. Once no additional new states are discovered, it may be determined that full coverage was reached. In some exemplary embodiments, reduction in the rate of discovery of new self-dominating states may indicate reaching high coverage.

In some exemplary embodiments, discovering many previously traversed self-dominating states may also indicate reaching high coverage.

In Step 258, a coverage value may be calculated and optionally outputted to the user. In some exemplary embodiments, the coverage value may be based on calculations such as performed in Steps 250 and/or 254. The coverage value may be displayed in a user interface to allow the user to determine if sufficient coverage was reached to stop the verification process.

In some exemplary embodiments, the method of FIG. 2 may be performed by a Formal Verification (FV) tool, such as a model checker which is configured to check for each state of the model that the specification property holds. In some exemplary embodiments, the FV tool may be configured to provide a user with an indication on the progress of the verification process based on the coverage metric.

Additionally or alternatively, the method of FIG. 2 may be performed by a testing tool testing the computer program. The testing tool may provide coverage measurement to the user, such as during execution of the tests, after execution of the tests, or the like, thereby providing some indication of the progress of the testing efforts.

Figure 3:
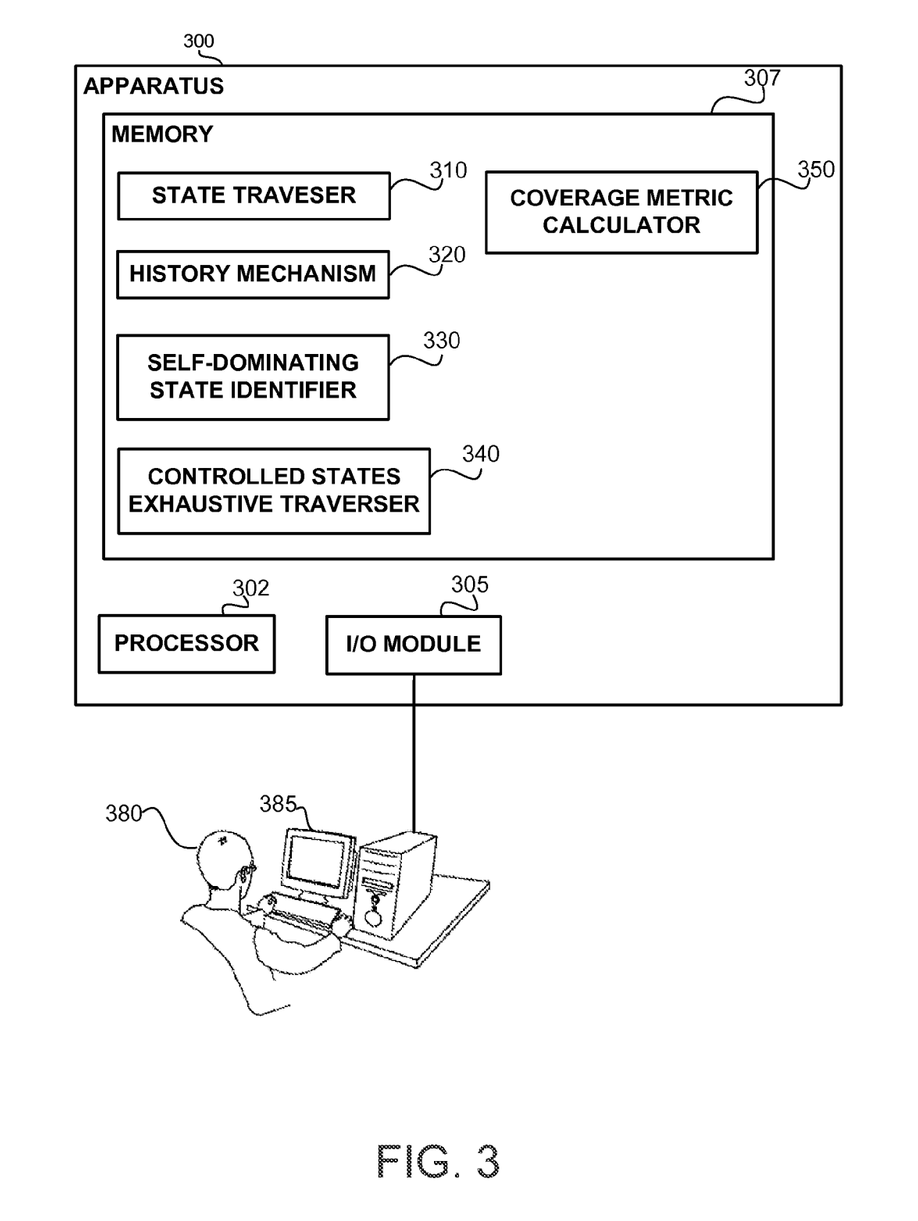
FIG. 3 shows a block diagram of components of an apparatus, in accordance with some exemplary embodiments of the disclosed subject matter.

Referring now to FIG. 3 showing a block diagram of components of an apparatus, in accordance with some exemplary embodiments of the disclosed subject matter. An apparatus 300 may be a computerized apparatus adapted to perform a method such as depicted in FIG. 2.

In some exemplary embodiments, Apparatus 300 may comprise a Processor 302. Processor 302 may be a Central Processing Unit (CPU), a microprocessor, an electronic circuit, an Integrated Circuit (IC) or the like. Alternatively, Apparatus 300 can be implemented as firmware written for or ported to a specific processor such as Digital Signal Processor (DSP) or microcontrollers, or can be implemented as hardware or configurable hardware such as field programmable gate array (FPGA) or application specific integrated circuit (ASIC). The processor 302 may be utilized to perform computations required by Apparatus 300 or any of it subcomponents.

In some exemplary embodiments of the disclosed subject matter, Apparatus 300 may comprise an Input/Output (I/O) Module 305 such as a terminal, a display, a keyboard, an input device or the like to interact with the system, to invoke the system and to receive results. It will however be appreciated that the system can operate without human operation.

In some exemplary embodiments, the I/O Module 305 may be utilized to provide an interface to a User 380 which may utilize a Man-Machine Interface (MMI) 385 to interact with Apparatus 300, such as by reviewing results, logs and the like, providing commands, rules, preferences, formulas or the like, or interacting in any similar manner. User 380 may be provided with coverage metric during execution and/or thereafter. User 380 may provide a command to Apparatus 300 to stop the verification process during execution.

In some exemplary embodiments, Apparatus 300 may comprise a Memory Unit 307. Memory Unit 307 may be persistent or volatile. For example, Memory Unit 307 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, Memory Unit 307 may retain program code operative to cause Processor 302 to perform acts associated with any of the steps shown in FIG. 2 above.

The components detailed below may be implemented as one or more sets of interrelated computer instructions, executed for example by Processor 302 or by another processor. The components may be arranged as one or more executable files, dynamic libraries, static libraries, methods, functions, services, or the like, programmed in any programming language and under any computing environment.

A State Traverser 310 may be configured to traverse states of a computer program. During traversal of a state, next states may be determined. In some exemplary embodiments, during traversal of a state bugs may be discovered, such as a state which refutes a specification property.

In response to traversing a state, the state or a fingerprint thereof may be introduced to a History Mechanism 320 which may be used to avoid traversing the same state a multiplicity of times. In some exemplary embodiments, History Mechanism 320 may be implemented by retaining hash signatures of the traversed states. Additionally or alternatively, a Bloom filter may be utilized to retain fingerprints of the states. Additionally or alternatively, the states may be stored in another preserving or non-preserving compression method. Additionally or alternatively, the states may be stored as is.

In some exemplary embodiments, State Traverser 310 may use History Mechanism 320 to verify that the state to be traversed has not been previously traversed.

A Self-Dominating State Identifier (SDSI) 330 may be configured to identify a self-dominating state. SDSI 330 may be configured to build or use a CFG of the program, and identify self-dominating nodes in the CFG, such as loop head nodes. SDSI 330 may be configured to identify a state associated with a self-dominating node, such as a state for which the program counter or instruction pointer refer to the self-dominating node.

State Traverser 310 may be configured to use SDSI 330 to identify a self-dominating state that is to be traversed. In response to traversing a self-dominating state, a Controlled States Exhaustive Traverser 340 may be utilized to traverse all controlled states that are dominated by the self-dominating state. Controlled States Exhaustive Traverser 340 may be configured to traverse all controlled state and not introduce the controlled states to History Mechanism 320.

Coverage Metric Calculator 350 may be configured to compute a coverage valued based on a coverage metric that takes into account traversal of self-dominating states. The coverage value may be outputted to User 380 during verification process performed by Apparatus 300 or thereafter.

The flowchart and block diagrams in the figures illustrate the architecture, functionality, and operation of possible implementations of systems, methods and computer program products according to various embodiments of the present disclosure. In this regard, each block in the flowchart and some of the blocks in the block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, any non-transitory computer-readable medium, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method performed by a processing unit, the method comprising:
   determining whether all possible states of a computer program were examined based on an analysis of states that were examined excluding controlled states that are dominated by a self-dominating states;
   wherein the controlled states are associated with a controlled node in a control flow graph of the computer program, wherein the self-dominating states are associated with a self-dominating node in the control flow graph;
   wherein each execution path in the control flow graph that reaches the controlled nodes also includes the self-dominating node; and
   wherein there exists an execution path in the control flow graph that both starts and ends at the self-dominating node and further includes at least one controlled node.

2. The computer-implemented method of claim 1, wherein the self-dominating node is a head node of a loop in the control flow graph and wherein the controlled nodes are nodes within the loop.

3. The computer-implemented method of claim 2, wherein the loop is an unbounded loop.

4. The computer-implemented method of claim 2, further comprising outputting a coverage metric value based on a number of self-dominating states examined.

5. The computer-implemented method of claim 4, wherein the metric is based on a growth factor in the number of self-dominating states examined.

6. The computer-implemented method of claim 2, further comprising verifying the computer program by traversing the control flow graph, wherein said verifying utilizes a state history mechanism that is based on an implicit indication of previous examination of states associated with the nodes within the loop.

7. The computer-implemented method of claim 6, wherein said verifying is formal verifying the computer program by explicitly traversing the control flow graph.

8. The computer-implemented method of claim 6, wherein said verifying utilizes a symbolic representation of the states of the computer program.

9. The computer-implemented method of claim 6, wherein the state history mechanism retains examined states or signature thereof, wherein the retained examined states do not comprise the states associated with the nodes within the loop.

10. The computer-implemented method of claim 6, further comprises:
    in response to examining a first state associated with the head node, examining all successive states associated with the nodes within the loop; and
    in response to having a second state associated with the head node to be examined, determining whether to examine the second state based on a history of examined self-dominated states, thereby enabling the state history mechanism to avoid keeping track of any examined state that is associated with the nodes within the loop.

11. A computerized apparatus having a processor coupled to a memory unit, the processor being adapted to perform the steps of:
    determining whether all possible states of a computer program were examined based on an analysis of states that were examined excluding controlled states that are dominated by a self-dominating states;
    wherein the controlled states are associated with a controlled node in a control flow graph of the computer program, wherein the self-dominating states are associated with a self-dominating node in the control flow graph;
    wherein each execution path in the control flow graph that reaches the controlled nodes also includes the self-dominating node; and
    wherein there exists an execution path in the control flow graph that both starts and ends at the self-dominating node and further includes at least one controlled node.

12. The apparatus of claim 11, wherein the self-dominating node is a head node of a loop in the control flow graph and wherein the controlled nodes are nodes within the loop.

13. The apparatus of claim 12, wherein the loop is an unbounded loop.

14. The apparatus of claim 12, wherein the processor is further adapted to output a coverage metric value based on a number of self-dominating states examined.

15. The apparatus of claim 14, wherein the metric is based on a growth factor in the number of self-dominating states examined.

16. The apparatus of claim 12, wherein the processor is further adapted to verify the computer program by traversing the control flow graph, wherein said verifying utilizes a state history mechanism that is based on an implicit indication of previous examination of states associated with the nodes within the loop.

17. The apparatus of claim 16, wherein said verifying is formal verifying the computer program by explicitly traversing the control flow graph.

18. The apparatus of claim 16, wherein said verifying utilizes a symbolic representation of the states of the computer program.

19. The apparatus of claim 16, wherein the state history mechanism retains examined states or signature thereof, wherein the retained examined states do not comprise the states associated with the nodes within the loop.

20. The apparatus of claim 16, wherein the processor is further adapted to perform the steps of:
   in response to examining a first state associated with the head node, examining all successive states associated with the nodes within the loop; and
   in response to having a second state associated with the head node to be examined, determining whether to examine the second state based on a history of examined self-dominated states, thereby enabling the state history mechanism to avoid keeping track of any examined state that is associated with the nodes within the loop.

21. A computer program product comprising a non-transitory computer readable medium retaining program instructions, which instructions when read by a processor, case the processor to perform the steps of:
   determining whether all possible states of a computer program were examined based on an analysis of states that were examined excluding controlled states that are dominated by a self-dominating states;
   wherein the controlled states are associated with a controlled node in a control flow graph of the computer program, wherein the self-dominating states are associated with a self-dominating node in the control flow graph;
   wherein each execution path in the control flow graph that reaches the controlled nodes also includes the self-dominating node; and
   wherein there exists an execution path in the control flow graph that both starts and ends at the self-dominating node and further includes at least one controlled node.

* * * * *